United States Patent
Price, III et al.

(10) Patent No.: US 7,383,439 B2
(45) Date of Patent: Jun. 3, 2008

(54) APPARATUS AND METHOD FOR FACILITATING ENCRYPTION AND DECRYPTION OPERATIONS OVER AN EMAIL SERVER USING AN UNSUPPORTED PROTOCOL

(75) Inventors: William F. Price, III, Los Altos, CA (US); David E. Allen, Mountain View, CA (US); Jonathan D. Callas, San Jose, CA (US)

(73) Assignee: PGP Corporation, Palo Alto, CA (US)

( * ) Notice: Subject to any disclaimer, the term of this patent is extended or adjusted under 35 U.S.C. 154(b) by 0 days.

(21) Appl. No.: 11/176,590

(22) Filed: Jul. 6, 2005

(65) Prior Publication Data

US 2006/0031670 A1    Feb. 9, 2006

Related U.S. Application Data

(60) Provisional application No. 60/599,610, filed on Aug. 5, 2004.

(51) Int. Cl.
*H04L 9/12* (2006.01)
*H04L 9/32* (2006.01)
*G06F 15/16* (2006.01)
*H04K 1/00* (2006.01)

(52) U.S. Cl. ............. 713/170; 709/206; 713/153; 380/255

(58) Field of Classification Search ......... 713/170, 713/153; 709/206; 380/255
See application file for complete search history.

(56) References Cited

U.S. PATENT DOCUMENTS

| | | | |
|---|---|---|---|
| 6,760,752 B1 * | 7/2004 | Liu et al. ............... | 709/206 |
| 6,988,199 B2 * | 1/2006 | Toh et al. ............... | 713/170 |
| 7,196,807 B2 * | 3/2007 | Goldstone ............... | 358/1.15 |
| 2003/0167409 A1 | 9/2003 | Sussman et al. | |
| 2003/0231207 A1 * | 12/2003 | Huang ................... | 345/752 |
| 2004/0019780 A1 * | 1/2004 | Waugh et al. ........... | 713/152 |
| 2004/0111644 A1 | 6/2004 | Sanders et al. | |
| 2005/0044101 A1 * | 2/2005 | Prasad et al. ........... | 707/102 |
| 2005/0131830 A1 * | 6/2005 | Juarez et al. ........... | 705/51 |
| 2005/0204148 A1 * | 9/2005 | Mayo et al. ............ | 713/185 |
| 2005/0209926 A1 * | 9/2005 | Hartman ................. | 705/26 |

OTHER PUBLICATIONS

Schneier, Bruce. Applied Cryptography. John Wiley & Sons. 1996. pp. 1-9, 185-187.*
Mehta, Manish. Introduction to Soap. Mar. 2001. pp. 1-4.*
Ramsdell, B. S/MIME Version 3 Message Specification. Jun. 1999. pp. 1-29.*
NIH Listserv Facility User's Guide, Oct. 2001, pp. 1-5. <http://list.nih.gov/LISTSERV_WEB/USERSGDE/web_int.htm>.*

* cited by examiner

*Primary Examiner*—Emmanuel L Moise
*Assistant Examiner*—Michael Pyzocha
(74) *Attorney, Agent, or Firm*—Cooley Godward Kronish LLP

(57) ABSTRACT

The invention includes a computer readable medium storing executable instructions to enroll a user with a secure email support facility. The computer readable medium includes executable instructions to send an enrollment message, supply a registration response, and confirm the registration response. An authentication email is also sent. A client identifies the authentication email. Authentication information within the authentication email is decrypted. The authentication information is used to authenticate the client and subsequently obtain access to a secure email support facility.

11 Claims, 3 Drawing Sheets

APPARATUS AND METHOD FOR FACILITATING ENCRYPTION AND DECRYPTION OPERATIONS OVER AN EMAIL SERVER USING AN UNSUPPORTED PROTOCOL

CROSS REFERENCE TO RELATED APPLICATIONS

This application claims the benefit of U.S. Provisional Application No. 60/599,610, entitled "Apparatus and Method for Facilitating Encryption and Decryption Operations Over an Email Server Using an Unsupported Protocol," filed on Aug. 5, 2004, the disclosure of which is incorporated herein by reference in its entirety.

BRIEF DESCRIPTION OF THE INVENTION

This invention relates generally to secure network communications. More particularly, this invention relates to a technique for facilitating encryption and decryption operations over a server that uses an unsupported protocol.

BACKGROUND OF THE INVENTION

FIG. 1 illustrates a prior art system 100 for facilitating encryption and decryption operations using an email server that utilizes a supported protocol. The system 100 includes a client machine 102 that communicates with an email server 106 through an encryption/decryption server 104. The encryption/decryption server 104 supports the protocol used by the email server 106. Therefore, the encryption/decryption server 104 can be positioned between the mailer server 106 and the client 102 and can offer encryption and decryption services to the client transparently. The email server 106 receives and transmits encrypted messages via the Internet 108. This prior art system is disclosed in a set of pending U.S. patent applications owned by PGP Corporation, Palo Alto, Calif., the assignee of the present invention. These applications include: System and Method for Secure and Transparent Electronic Communication, Ser. No. 10/462,775; System and Method For Dynamic Security Operations, Ser. No. 10/462,607; and System and Method for Secure Electronic Communication in a Partially Keyless Environment, Ser. No. 10/462,618. The content of these applications is incorporated herein by reference.

The configuration of FIG. 1 is not available if the protocol used by the email server 106 is unsupported (e.g., it is proprietary or otherwise not supported by the encryption/decryption server 104). In this case, the encryption/decryption server 104 cannot be positioned between the email server 106 and the client 102. Accordingly, the encryption/decryption server 104 cannot authenticate the client 102 or otherwise directly process email between the email server 106 and the client 102.

In view of this problem, it would be desirable to provide a technique that allows the encryption/decryption server to operate with an email server using an unsupported protocol. More particularly, it would be desirable to provide a technique to authenticate a client and to then facilitate encryption and decryption operations over an email server using an unsupported protocol.

SUMMARY OF THE INVENTION

The invention includes a computer readable medium storing executable instructions to enroll a user with a secure email support facility. The computer readable medium includes executable instructions to send an enrollment message, supply a registration response, and confirm the registration response. An authentication email is also sent. A client identifies the authentication email. Authentication information within the authentication email is decrypted. The authentication information is used to authenticate the client and subsequently obtain access to a secure email support facility.

The invention also includes executable instructions to send an enrollment message, confirm a response to the enrollment message, identify an authentication message, decrypt authentication information in the authentication message, and store decrypted authentication information.

The invention also includes executable instructions to supply a open access protocol response to an enrollment message generated by a client machine, send an authentication email to the client machine via a Multipurpose Internet Mail Extensions (MIME) message, and authenticate the client machine by processing information received in the MIME message at the client machine.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
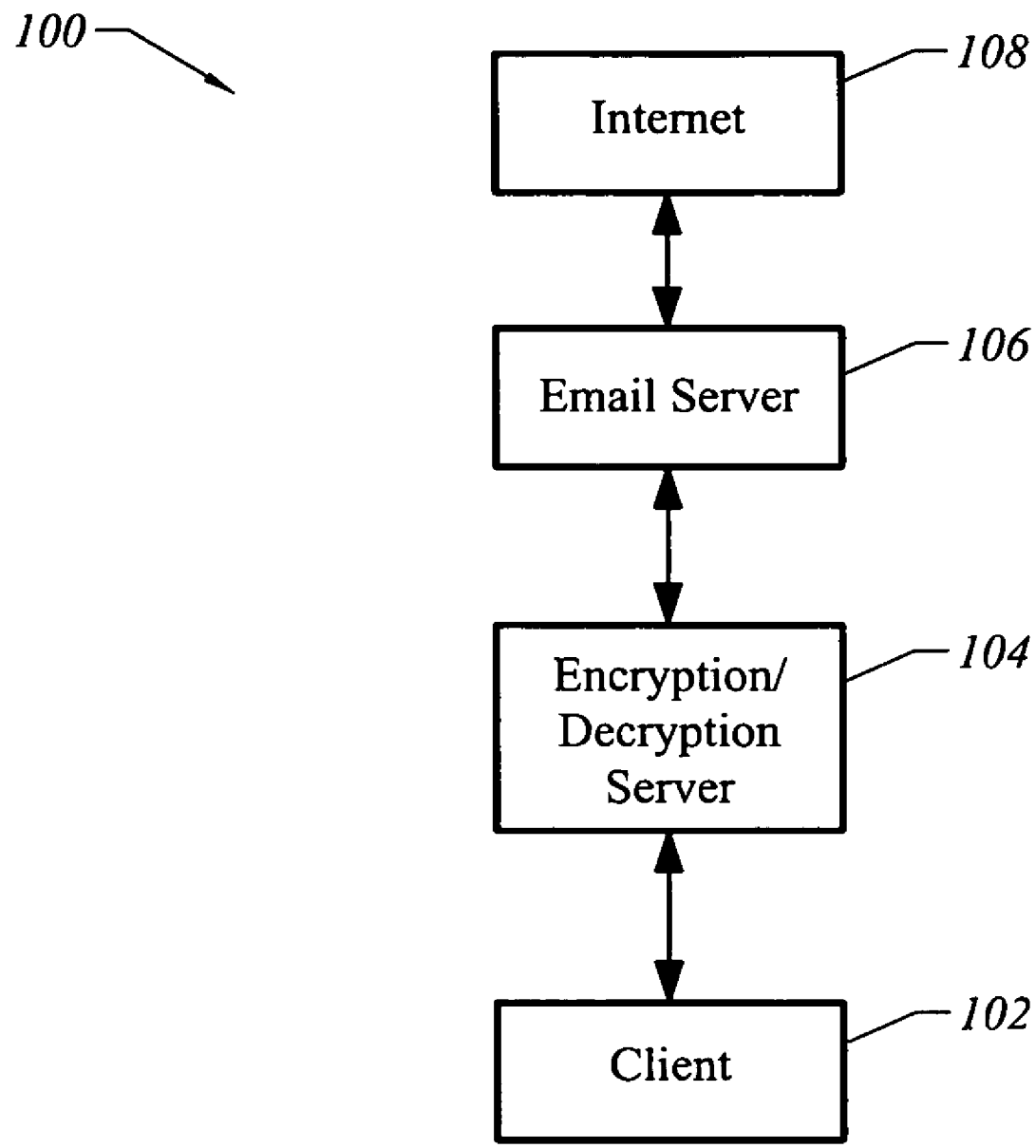
FIG. 1 illustrates a prior art system for supporting encryption and decryption operations.
Figure 2:
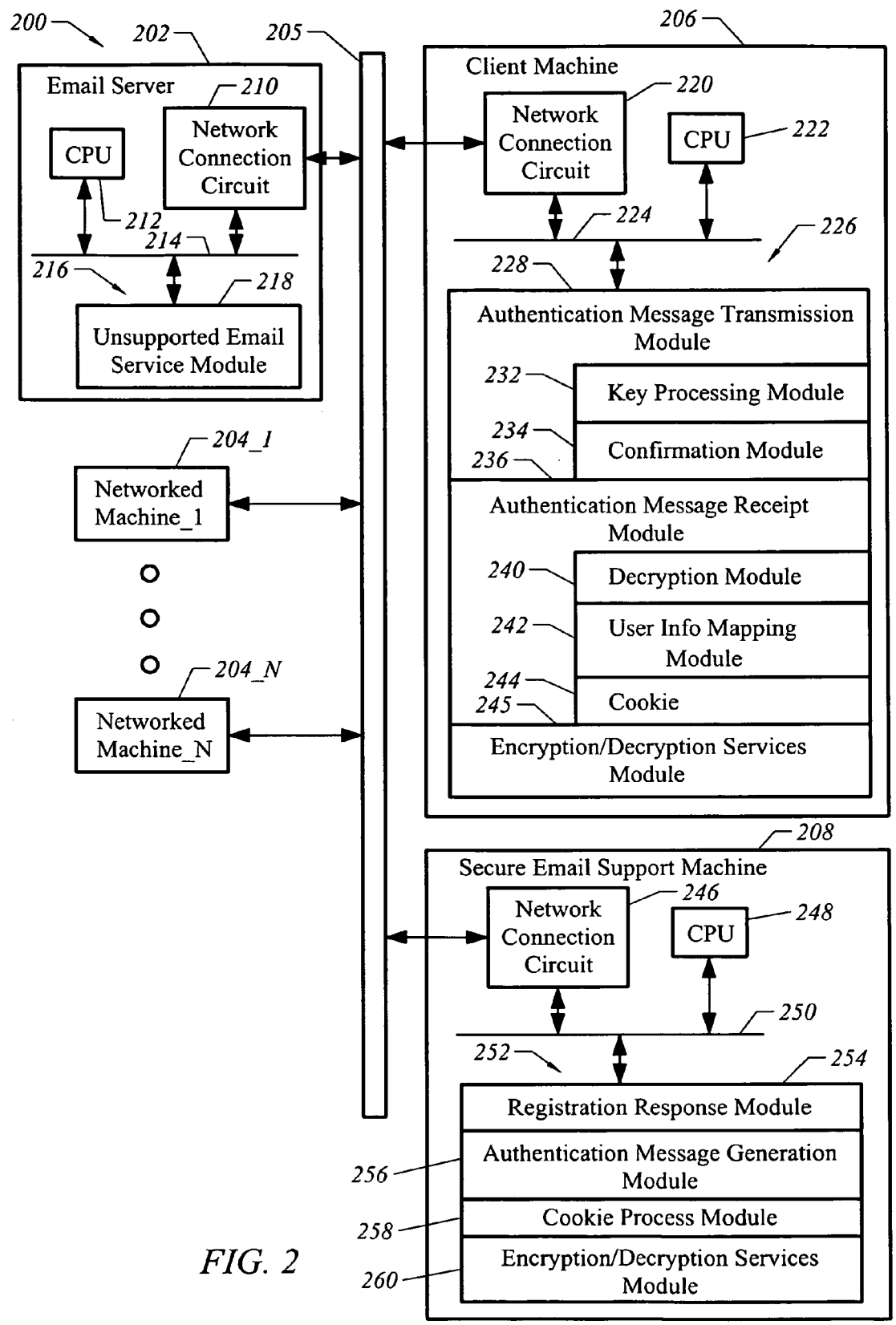
FIG. 2 illustrates a network, configured in accordance with an embodiment of the invention, for facilitating encryption and decryption operations over a email server using an unknown protocol.

FIG. 2 illustrates a network 200 configured in accordance with an embodiment of the invention. The network 200 includes an email server 202. The email server 202 utilizes an unsupported email service; that is, the email service is unsupported with respect to another machine that facilitates secure email services. The network 200 also includes set of networked machines 204_1 through 204_N. The networked machines may be email servers utilizing supported or unsupported email services. The networked machines may also be any type of client machine, including, for example, a personal computer, a personal digital assistant, and the like. The email server 202 and the networked machines 204 are linked by a transmission infrastructure 205, which may be any wired or wireless transmission medium.

Also connected to the transmission infrastructure 205 is a client machine 206, which is configured with software to implement operations of the invention. A secure email support machine 208, configured with software to implement operations of the invention, is also connected to the transmission infrastructure 205. The secure email support machine 208 facilitates the encryption and decryption of email messages. That is, the secure email support machine 208 participates in at least a portion of the process of encrypting or decrypting email messages associated with the client 206. Thus, the secure email support machine 208 operates as a secure email support facility.

The email server 202 includes standard components, such as a network connection circuit 210, which is linked to a CPU 212 over a bus 214. A memory 216 is also connected to the bus 214. The memory 216 stores an unsupported email service module 218. The email service module 218 is unsupported to the extent that the secure email support machine 208 cannot communicate with it using the protocol used by email server 202.

The client machine 206 also includes standard components, such as a network connection circuit 220, a CPU 222 and a bus 224. A memory 226 is also connected to the bus 224. The memory 226 stores a set of executable instructions used to implement operations of the invention. The executable instructions include an authentication message transmission module 228. This module 228 may include a key processing module 232 and a confirmation module 234. The memory 226 also stores an authentication message receipt module 236. This module 236 may be implemented with a decryption module 240 and a user information mapping module 242. The authentication message receipt module 236 produces a cookie 244, which is stored in memory 226. As known in the art, a cookie is a text string that can be passed and processed through standard browser operations.

The client machine 206 also includes an encryption/decryption services module 245. This module includes executable instructions to support encryption and decryption services after the client has been authenticated.

The secure email support machine 208 also includes standard components, such as a network connection circuit 246, a CPU 248, and a bus 250. A memory 252 is also connected to the bus 250. The memory 252 stores executable instructions used to implement operations of the invention. In this embodiment, the memory stores a registration response module 254, an authentication message generation module 256, a cookie process module 258, and an encryption/decryption services module 260.

Various modules for implementing operations of the invention have now been introduced. It should be appreciated that these modules are exemplary. The operations of the invention may be implemented in any number of modules or configurations. Similarly, the network location at which these modules execute is insignificant. It is the operations of the invention, regardless of how they are implemented or where they are implement that are significant.

Figure 3:
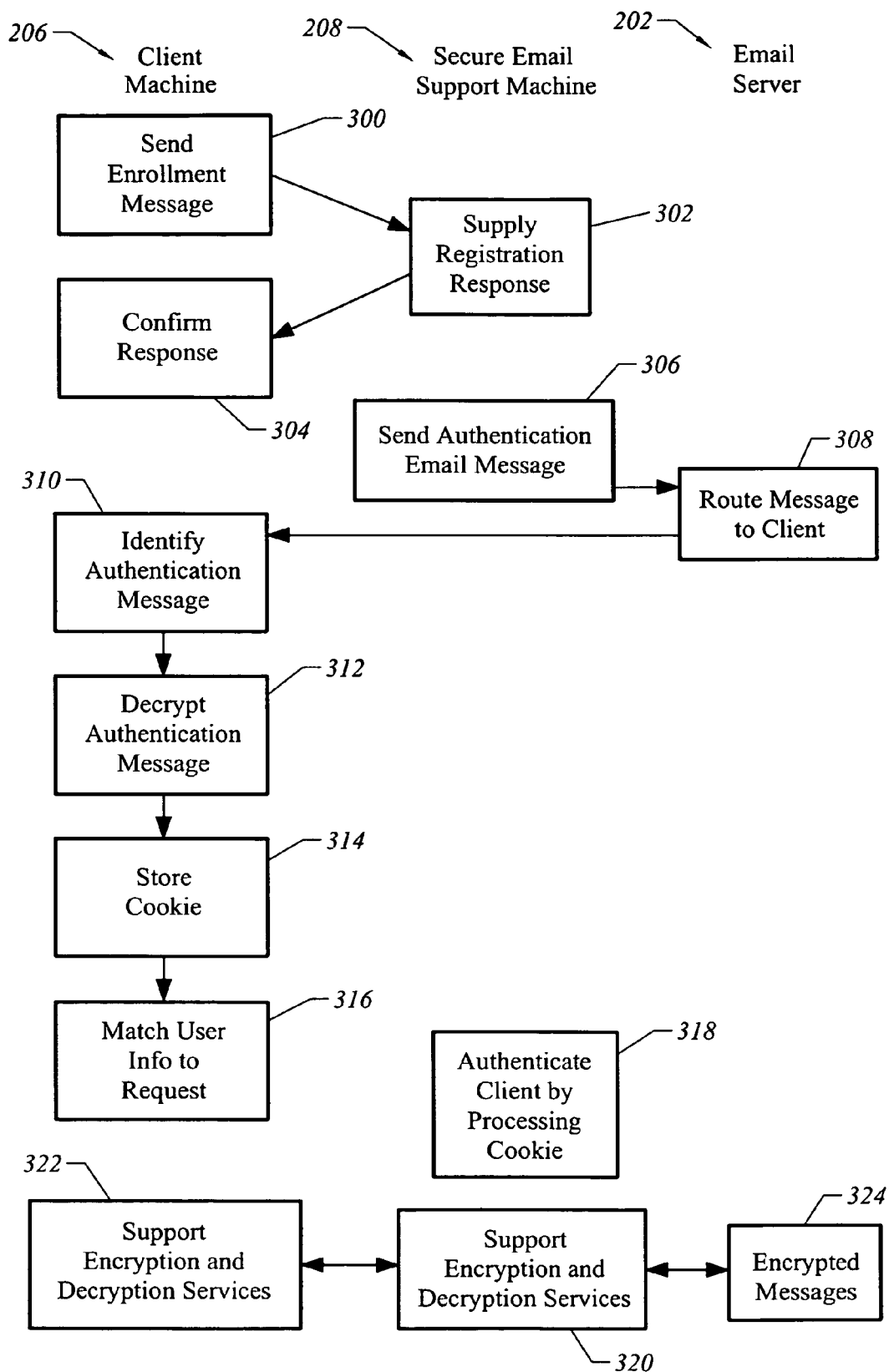
FIG. 3 illustrates processing operations associated with the network of FIG. 2.

FIG. 3 illustrates processing operations associated with an embodiment of the invention. The figure illustrates various locations for performing various operations of the invention. In particular, the figure includes a client machine 206 and a set of operations underneath the client machine that may be performed by the client machine. Similarly, the figure illustrates a secure email support machine 208 and associated operations performed in accordance with an embodiment of the invention. Finally, the figure also illustrates an email server 202 and operations that may be implemented by the email server.

The first processing operation shown in FIG. 3 is to send an enrollment message 300. An enrollment message will be generated to initiate the process of allowing the secure email support machine 208 to facilitate encryption and decryption operations using an email server that uses an unsupported email protocol. The authentication message transmission module 228 may be used to implement this operation. The generated enrollment message includes a public key for the user at the client machine 206. The key processing module 232 may be used to insert the public key into the enrollment message. Below is an example enrollment message that may be produced by the authentication message transmission module 228.

```
<se:Envelope>
    xmlns:se="http://schemas.xmlsoap.org/soap/envelope/"
    se:encodingStyle="http://schemas.xmlsoap.org/soap/encoding/">
    <se:Header>
        <version>
            <major>1</major>
            <minor>1</minor>
        </version>
    </se:Header>
    <se:Body>
        <ovidsrv:Enroll xmlns:ovidsrv="http://www.pgp.com/">
            <email>foo@foo.com</email>
            <keyblock>-----BEGIN PGP PUBLIC KEY BLOCK-----
            . . .
            -----END PGP PUBLIC KEY BLOCK-----</keyblock>
            <user-value>CLIENT_SPECIFIED_USER_VALUE</user-value>
            <version>
                <major>1</major>
                <minor>1</minor>
            </version>
        </ovidsrv:Enroll>
    </se:Body>
</se:Envelope>
```

In this example, the message is a Simple Object Access Protocol (SOAP) message. SOAP is a protocol specification for invoking methods. SOAP codifies the existing practice of using XML and HTTP as a method invocation mechanism. The SOAP specification mandates a small number of HTTP headers that facilitate firewall/proxy filtering. The SOAP specification also mandates an XML vocabulary that is used for representing method parameters, return values, and exceptions. The foregoing message conforms with these requirements. Observe that the message includes an "<email>" tag that specifies the email address of the user generating the message. The message also includes a "<keyblock>" tag to mark a key that will be used by the secure email support machine 208. The message also includes a "<user-value>" tag. This tag is a client-specified user value to match an enrollment response with an enrollment request. This value is useful in the event that the user endeavors to enroll on a variety of email servers at the same time.

The enrollment message is routed to the secure email support machine 208, which then supplies a response 302. The response is required in accordance with the SOAP protocol. The registration response module 254 of the secure email support machine 208 includes executable instructions to identify the enrollment message and to generate a response. Below is an example of a response generated by the registration response module 254.

```
<se:Envelope>
    xmlns:se="http://schemas.xmlsoap.org/soap/envelope/"
    se:encodingStyle="http://schemas.xmlsoap.org/soap/encoding/">
    <se:Header>
        <version>
            <major>1</major>
            <minor>1</minor>
        </version>
    </se:Header>
    <se:Body>
        <ovidsrv:EnrollResponse
```

```
xmlns:ovidsrv="http://www.pgp.com/"/>
    </se:Body>
</se:Envelope>
```

This response is sent to the client machine 206, which confirms that the response was received 304. The confirmation module 234 of the client machine 206 includes executable instructions to confirm the response. The confirmation module 234 reads this SOAP message and extracts information to confirm the response.

The secure email support machine 208 performs an additional operation in response to the enrollment message. In particular, an authentication message generation module 256 includes executable instructions to send an email message with authentication information through the network 306. Below is an example of an authentication message that may be generated by the authentication message generation module 256.

```
Mime-Version: 1.0
From: PGP Universal <pgpuniversal-admin@foo.com>
To: <foo@foo.com>
Subject: Welcome to PGP Universal
Content-Type: text/plain; charset=utf-8
X-PGP-Universal-Enrollment: yes
Welcome to PGP Universal!
PGP Universal is now securing your email. You do not need to do
anything to benefit from the security PGP Universal is automatically
providing for you.
Ignore the following text. It is used by PGP Universal to complete
the process of securing your email.
-----BEGIN PGP MESSAGE-----
qANQR1DBw04DT27wyEs0idgQD/
9hlvOltysAC+LFP8tlzUQH3pR5d4f8zWfOpvar
pCpQHSxGaqPry8qKVZf4yZ9dvj3x/94z0Wqu76q9x8Gn
=I8yC
-----END PGP MESSAGE-----
```

Observe that this is a standard Multipurpose Internet Mail Extensions (MIME) message that can be processed by the email server 202. Thus, the email server 202 or another email server routes the message to the client 308. Observe that the message is sent to the client using the email address (foo@foo.com) specified in the original enrollment message. Also observe that the message includes a header "X-PGP-Universal—Enrollment: yes". As discussed below, this header is used by the client machine 206 to identify the authentication message. Between the "BEGIN PGP MESSAGE" and the "END PGP MESSAGE" is encrypted information. As discussed below, the encrypted information includes user information and a cookie. The information is encrypted using the key sent in the enrollment message.

As shown in FIG. 3, this message is routed to the client machine 206. The client machine identifies the authentication message 310. The authentication message receipt module 236 includes executable instructions to implement this operation. This module includes instructions to identify the "X-PGP-Universal—Enrollment: yes" header.

The message is then decrypted 312. The decryption module 240 may be used to implement this operation. In particular, the decryption module 240 uses the private key of the user to decrypt the information. In this example, the decryption operation results in the following content.

```
<EnrollmentStatus>
    <cookie>CAAAAAPTJFT1ENF . . . WXPEPNLJ</cookie>
    <user-value> CLIENT_SPECIFIED_USER_VALUE</user-value>
</EnrollmentStatus>
```

Note that this content includes a cookie and a user-value, which is the client specified user value generated in connection with the enrollment message. The cookie is stored 314. In addition, the user value is matched to the user request 316. The user information mapping module 242 executes instructions to coordinate this authentication message with a request generated by the client machine 206.

The next processing operation of FIG. 3 is for the secure email support machine 208 to authenticate the client by processing the stored cookie 318. The cookie 318 is passed to the secure machine 208 using standard techniques. If the received cookie matches the sent cookie, the client machine 206 is authenticated. Executable instructions of the cookie process module 258 may be used in this operation. At this point, the secure email support machine 208 knows that the client machine is a legitimate client of the email server 202 using the unknown email service. Therefore, the secure email support machine 208 can now treat this client as a trusted client and facilitate encryption and decryption services. Thus, as shown in FIG. 3, the secure email support machine 208 supports encryption and decryption services 320. The encryption/decryption services module 260 is used to implement this operation. These services are supported in conjunction with operations performed on the client machine 206. That is, the client machine 206 also supports encryption and decryption services 322. The client machine has an encryption/decryption services module 245 to support these operations. This allows the email server 202 to send and receive encrypted messages 324.

The following scenarios characterize some encryption and decryption services that may now be supported in accordance with the invention. In the event of an outgoing message that is to be encrypted, the encryption/decryption services module 245 of the client machine 206 sends a message to the secure email support machine 208 requesting the public key for a message recipient. The encryption/decryption services module 260 of the secure email support machine 208 supplies the public key of the recipient. The encryption/decryption services module 245 of the client machine 206 then encrypts the message to the recipient's public key. The encryption/decryption services module 245 then launches the encrypted email to the email server 202.

For an incoming encrypted message, the client machine 206 downloads the encrypted message. If the client machine 206 does not have a private key, the encryption/decryption services module 245 requests the private key from the secure email support machine 208. If available, the secure email support machine 208, via the encryption/decryption services module 260, supplies the key. The encryption/decryption services module 245 of the client machine 205 then decrypts the message using the key.

If the message is also signed, the encryption/decryption services module 245 of the client machine 206 requests the sender's public key to verify the signature. The encryption/decryption services module 260 of the secure email support machine 208 supplies the public key to the client 206. The encryption/decryption services module 245 of the client machine 206 can then verify the signature.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. Computer readable media, including executable instructions to:
   send an enrollment message with a public key from a client machine;
   supply, from a secure email support machine, a registration response;
   confirm said registration response at said client machine;
   send, in response to said enrollment message, an authentication email from said secure email support machine to an email server, wherein said authentication email includes user information and a cookie encrypted with said public key;
   identify at said client machine said authentication email received from said email server;
   decrypt, within said client machine using a private key corresponding to said public key, authentication information within said authentication email to yield said user information and said cookie;
   send to said secure email support machine said cookie; and
   process, at said secure email support machine, said cookie to authenticate said client and thereafter facilitate the exchange of secure email, said secure email support machine participating in at least a portion of the process of encrypting or decrypting email messages associated with said client.

2. The computer readable media of claim 1 wherein said executable instructions to send an enrollment message include executable instructions to send a Simple Object Access Protocol (SOAP) enrollment message.

3. The computer readable media of claim 1 wherein said executable instructions to supply a registration response include executable instructions to supply a Simple Object Access Protocol (SOAP) registration response.

4. The computer readable media of claim 1 wherein said executable instructions to send an authentication email include executable instructions to send a Multipurpose Internet Mail Extensions (MIME) authentication email.

5. The computer readable media of claim 1 wherein said executable instructions to identify include executable instructions to identify a pre-determined Multipurpose Internet Mail Extensions (MIME) header.

6. The computer readable media of claim 1 further comprising executable instructions to facilitate encryption and decryption operations after authentication of said user at said client.

7. A computer readable medium, said computer readable medium including executable instructions to:
   send an enrollment message with a public key from a client machine to a secure email support machine;
   confirm a response to said enrollment message;
   identify an authentication message received by said client machine from an email server, wherein said authentication message is initiated by said secure email support machine in response to said enrollment message, wherein said authentication message includes user information and a cookie encrypted with said public key;
   decrypt authentication information in said authentication message to yield said user information and said cookie;
   store said user information;
   send to said secure email support machine said cookie; and
   exchange secure email, said secure email support machine participating in at least a portion of the process of encrypting or decrypting email messages associated with said client.

8. The computer readable medium of claim 7 wherein said executable instructions to send an enrollment message include executable instructions to send a Simple Object Access Protocol (SOAP) enrollment message.

9. The computer readable medium of claim 7 wherein said executable instructions to confirm a response include executable instructions to process a Simple Object Access Protocol (SOAP) response.

10. The computer readable medium of claim 7 wherein said executable instructions identify an authentication message include executable instructions to identify a pre-determined Multipurpose Internet Mail Extensions (MIME) header.

11. The computer readable medium of claim 7 further comprising executable instructions to match said user information to an enrollment request.

* * * * *